(12) United States Patent
Sims et al.

(10) Patent No.: US 10,298,682 B2
(45) Date of Patent: May 21, 2019

(54) CONTROLLING DEVICE DATA COLLECTORS USING OMNI-COLLECTION TECHNIQUES

(71) Applicant: Bank of America Corporation, Charlotte, NC (US)

(72) Inventors: Scott A. Sims, Tega Cay, SC (US); Craig Widmann, Chandler, AZ (US); Don Cardinal, San Antonio, TX (US); Elizabeth S. Votaw, Potomac, MD (US)

(73) Assignee: Bank of America Corporation, Charlotte, NC (US)

(*) Notice: Subject to any disclaimer, the term of this patent is extended or adjusted under 35 U.S.C. 154(b) by 344 days.

(21) Appl. No.: 15/229,341

(22) Filed: Aug. 5, 2016

(65) Prior Publication Data
US 2018/0041575 A1    Feb. 8, 2018

(51) Int. Cl.
*G06F 15/173* (2006.01)
*H04L 29/08* (2006.01)
(Continued)

(52) U.S. Cl.
CPC ...... *H04L 67/1095* (2013.01); *H04L 63/0236* (2013.01); *H04L 67/10* (2013.01);
(Continued)

(58) Field of Classification Search
CPC ..... H04L 67/1095; H04L 67/10; H04L 67/42; H04L 63/0236; H04W 4/38; H04W 12/06; H04W 12/12
(Continued)

(56) References Cited

U.S. PATENT DOCUMENTS 7,472,422 B1 * 12/2008 Agbabian ............... H04L 41/06
                                                    726/25
8,825,830 B2 * 9/2014 Newton ............. H04L 41/0893
                                                   709/223

(Continued)

OTHER PUBLICATIONS

"Advanced Fraud Tools / Client-Side Implementation," JS Braintree Developer Documentation, accessed Jul. 25, 2016 from https://developers.braintreepayments.com/guides/advanced-fraud-toold/client-side/javascript/v2, 5 pages.

*Primary Examiner* — Kristie D Shingles
(74) *Attorney, Agent, or Firm* — Banner & Witcoff, Ltd.; Michael A. Springs

(57) ABSTRACT

Aspects of the disclosure relate to controlling device data collectors using omni-collection techniques. A computing platform may receive configuration settings associated with a first collector and a second collector. Subsequently, the computing platform may generate one or more configuration commands for a native collector based on the configuration settings. The computing platform may send, to a client interface computing platform associated with the native collector, the one or more configuration commands generated for the native collector. Thereafter, the computing platform may receive state information collected by the native collector based on the one or more configuration commands generated for the native collector. Then, the computing platform may send the state information to an authentication hub computing platform, and sending the state information may cause the authentication hub computing platform to share at least a portion of the state information with one or more collector support servers for processing.

20 Claims, 11 Drawing Sheets

(51) Int. Cl.
  *H04L 29/06* (2006.01)
  *H04W 12/06* (2009.01)
  *H04W 12/12* (2009.01)
  *H04W 4/38* (2018.01)
(52) U.S. Cl.
  CPC ............... *H04L 67/42* (2013.01); *H04W 4/38* (2018.02); *H04W 12/06* (2013.01); *H04W 12/12* (2013.01)
(58) Field of Classification Search
  USPC .......................................................... 709/224
  See application file for complete search history.

(56) References Cited

U.S. PATENT DOCUMENTS

| | | | |
|---|---|---|---|
| 9,461,996 B2 * | 10/2016 | Hayton | ............... H04L 63/0815 |
| 2016/0065476 A1 | 3/2016 | Reddy et al. | |
| 2016/0065732 A1 | 3/2016 | Davis et al. | |
| 2016/0069919 A1 | 3/2016 | Holmes et al. | |
| 2016/0069920 A1 | 3/2016 | Holmes et al. | |
| 2016/0069921 A1 | 3/2016 | Holmes et al. | |
| 2016/0070276 A1 | 3/2016 | Joshi et al. | |
| 2016/0070614 A1 | 3/2016 | Joshi et al. | |
| 2016/0070920 A1 | 3/2016 | Joshi et al. | |
| 2016/0071148 A1 | 3/2016 | Joshi et al. | |
| 2016/0071183 A1 | 3/2016 | Joshi et al. | |
| 2016/0071184 A1 | 3/2016 | Joshi et al. | |
| 2016/0071196 A1 | 3/2016 | Joshi et al. | |
| 2016/0071219 A1 | 3/2016 | Joshi et al. | |
| 2016/0072771 A1 | 3/2016 | Krietzman | |
| 2016/0072815 A1 | 3/2016 | Rieke et al. | |
| 2016/0072891 A1 | 3/2016 | Joshi et al. | |
| 2016/0075531 A1 | 3/2016 | Nireki | |
| 2016/0077015 A1 | 3/2016 | Holmes et al. | |
| 2016/0084863 A1 | 3/2016 | Holmes et al. | |
| 2016/0086108 A1 | 3/2016 | Abelow | |
| 2016/0088006 A1 | 3/2016 | Gupta et al. | |
| 2016/0098788 A1 | 4/2016 | Wang | |
| 2016/0103123 A1 | 4/2016 | Holmes et al. | |
| 2016/0119380 A1 | 4/2016 | Gutesman et al. | |
| 2016/0124009 A1 | 5/2016 | Wasson et al. | |
| 2016/0133582 A1 | 5/2016 | Marinet et al. | |
| 2016/0134495 A1 | 5/2016 | Banescu et al. | |
| 2016/0134639 A1 | 5/2016 | Kaminsky | |
| 2016/0135020 A1 | 5/2016 | Moshir et al. | |
| 2016/0142887 A1 | 5/2016 | Hosier, Jr. | |
| 2016/0148316 A1 | 5/2016 | Keld et al. | |
| 2016/0148469 A1 | 5/2016 | Floss et al. | |
| 2016/0157700 A1 | 6/2016 | Nearman et al. | |
| 2016/0158624 A1 | 6/2016 | Porter et al. | |
| 2016/0164915 A1 | 6/2016 | Cook | |
| 2016/0169880 A1 | 6/2016 | Holmes et al. | |
| 2016/0169923 A1 | 6/2016 | Holmes et al. | |
| 2016/0173696 A1 | 6/2016 | Nortz et al. | |
| 2016/0180022 A1 | 6/2016 | Paixao | |
| 2016/0180480 A1 | 6/2016 | Gross et al. | |
| 2016/0189118 A2 | 6/2016 | Cohen | |
| 2016/0203473 A1 | 7/2016 | Curtis | |
| 2016/0203485 A1 | 7/2016 | Subramanian et al. | |
| 2016/0203487 A1 | 7/2016 | Eisen | |
| 2016/0205002 A1 | 7/2016 | Rieke et al. | |
| 2016/0210515 A1 | 7/2016 | Heier et al. | |
| 2016/0210734 A1 | 7/2016 | Kass et al. | |
| 2016/0216286 A1 | 7/2016 | Holmes et al. | |
| 2016/0216287 A1 | 7/2016 | Holmes et al. | |
| 2016/0217436 A1 | 7/2016 | Brama | |

\* cited by examiner

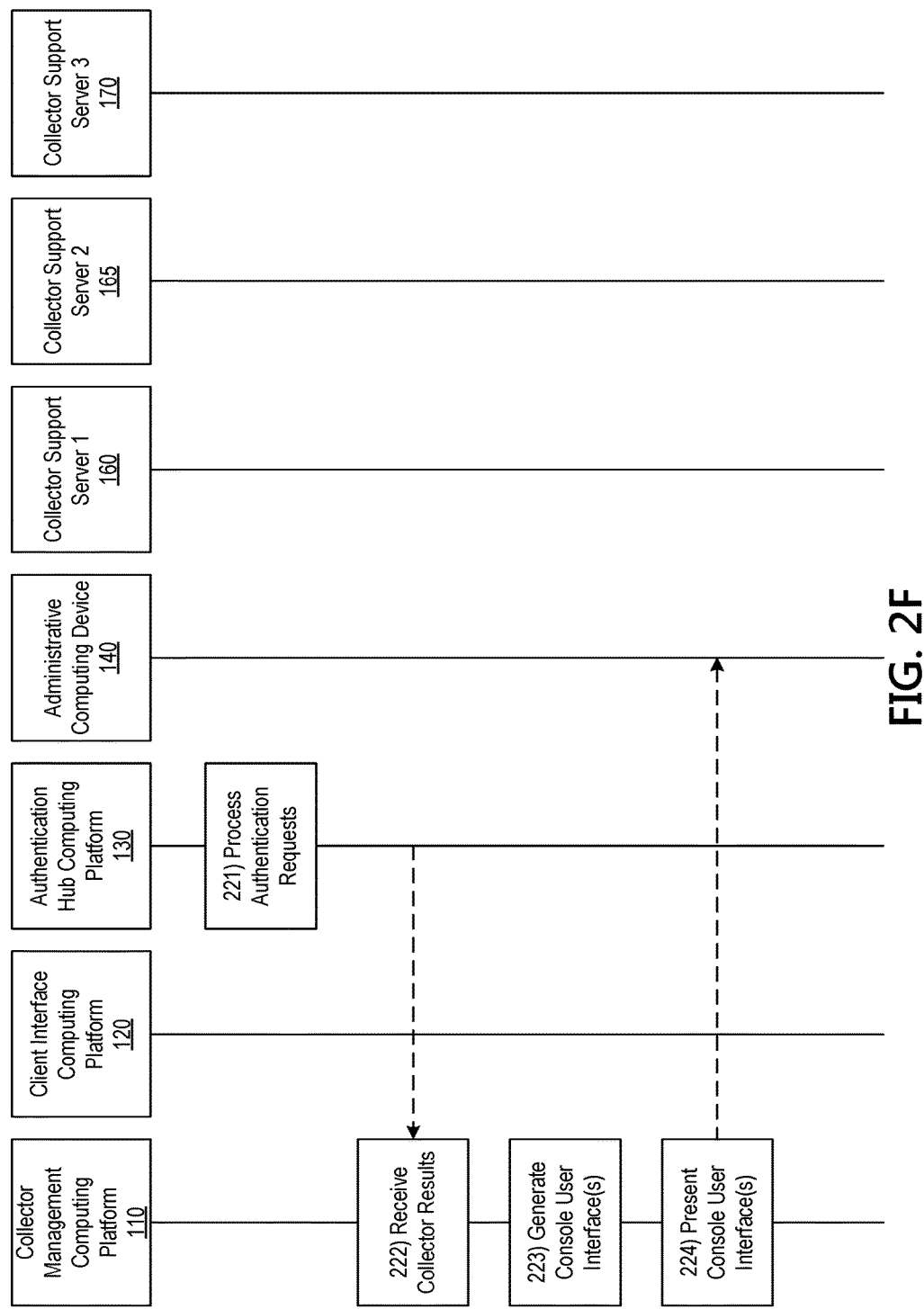

CONTROLLING DEVICE DATA COLLECTORS USING OMNI-COLLECTION TECHNIQUES

BACKGROUND

Aspects of the disclosure relate to providing information security and preventing unauthorized access to resources of information systems. In particular, one or more aspects of the disclosure relate to controlling device data collectors using omni-collection techniques to provide information security and prevent unauthorized access to resources of information systems.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of information systems. In particular, one or more aspects of the disclosure provide techniques for controlling device data collectors, which may be used by information security computer systems and other security infrastructure to collect and evaluate device state information and/or other information from user devices.

In accordance with one or more embodiments, a computing platform having at least one processor, a memory, and a communication interface may receive first configuration settings associated with a first collector and second configuration settings associated with a second collector. Subsequently, the computing platform may generate one or more configuration commands for a native collector based on the first configuration settings associated with the first collector and the second configuration settings associated with the second collector. The computing platform may send, via the communication interface, to a client interface computing platform associated with the native collector, the one or more configuration commands generated for the native collector. Thereafter, the computing platform may receive, via the communication interface, from the client interface computing platform associated with the native collector, state information collected by the native collector based on the one or more configuration commands generated for the native collector. Then, the computing platform may send, via the communication interface, to an authentication hub computing platform, the state information received from the client interface computing platform associated with the native collector. In addition, sending the state information received from the client interface computing platform associated with the native collector to the authentication hub computing platform may cause the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector.

In some embodiments, the first configuration settings associated with the first collector may define a first set of data elements requested by the first collector, and the second configuration settings associated with the second collector may define a second set of data elements requested by the second collector. In some instances, the first configuration settings associated with the first collector may include first version information identifying a version of the first collector, and the second configuration settings associated with the second collector may include second version information identifying a version of the second collector.

In some embodiments, generating the one or more configuration commands for the native collector based on the first configuration settings associated with the first collector and the second configuration settings associated with the second collector may include: generating at least one command for the native collector directing the native collector to collect one or more data elements requested by the first collector; and generating at least one command for the native collector directing the native collector to collect one or more data elements requested by the second collector.

In some embodiments, sending the state information received from the client interface computing platform associated with the native collector to the authentication hub computing platform may include sending at least one command to the authentication hub computing platform directing the authentication hub computing platform to aggregate device data collected by the native collector for processing by one or more collector support servers.

In some embodiments, sending the state information received from the client interface computing platform associated with the native collector to the authentication hub computing platform may include sending at least one command to the authentication hub computing platform directing the authentication hub computing platform to send device data collected by the native collector to at least one collector support server for processing by the at least one collector support server.

In some embodiments, the authentication hub computing platform may be configured to receive collector results data from the first collector support server associated with the first collector and the second collector support server associated with the second collector. In addition, the authentication hub computing platform may be configured to process one or more authentication requests based on the collector results data received from the first collector support server associated with the first collector and the second collector support server associated with the second collector.

In some embodiments, the computing platform may receive, via the communication interface, from the authentication hub computing platform, collector results information comprising first collector results information associated with the first collector and second collector results information associated with the second collector.

In some embodiments, the computing platform may generate a collector console user interface based on the collector results information received from the authentication hub computing platform. In addition, the computing platform may cause the collector console user interface to be presented on an administrative computing device. In some instances, generating the collector console user interface based on the collector results information received from the authentication hub computing platform may include generating a collector alert user interface. In some instances, generating the collector console user interface based on the collector results information received from the authentication hub computing platform may include generating a collector version management user interface.

In some embodiments, the computing platform may receive third configuration settings associated with a third collector. Subsequently, the computing platform may generate one or more additional configuration commands for the native collector based on the third configuration settings associated with the third collector. The computing platform may send, via the communication interface, to the client interface computing platform associated with the native collector, the one or more additional configuration commands generated for the native collector. Thereafter, the computing platform may receive, via the communication interface, from the client interface computing platform associated with the native collector, additional state information collected by the native collector based on the one or more additional configuration commands generated for the native collector. Then, the computing platform may send, via the communication interface, to the authentication hub computing platform, the additional state information received from the client interface computing platform associated with the native collector. In addition, sending the additional state information received from the client interface computing platform associated with the native collector to the authentication hub computing platform may cause the authentication hub computing platform to share at least a portion of the additional state information received from the client interface computing platform associated with the native collector with a third collector support server associated with the third collector for processing by the third collector support server associated with the third collector.

In some embodiments, the computing platform may receive, via the communication interface, from the authentication hub computing platform, additional collector results information comprising third collector results information associated with the third collector.

In some embodiments, the computing platform may generate an updated collector console user interface based on the additional collector results information received from the authentication hub computing platform. In addition, the computing platform may cause the updated collector console user interface to be presented on an administrative computing device. In some instances, generating the updated collector console user interface based on the additional collector results information received from the authentication hub computing platform may include generating a collector comparison user interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for controlling device data collectors using omni-collection techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
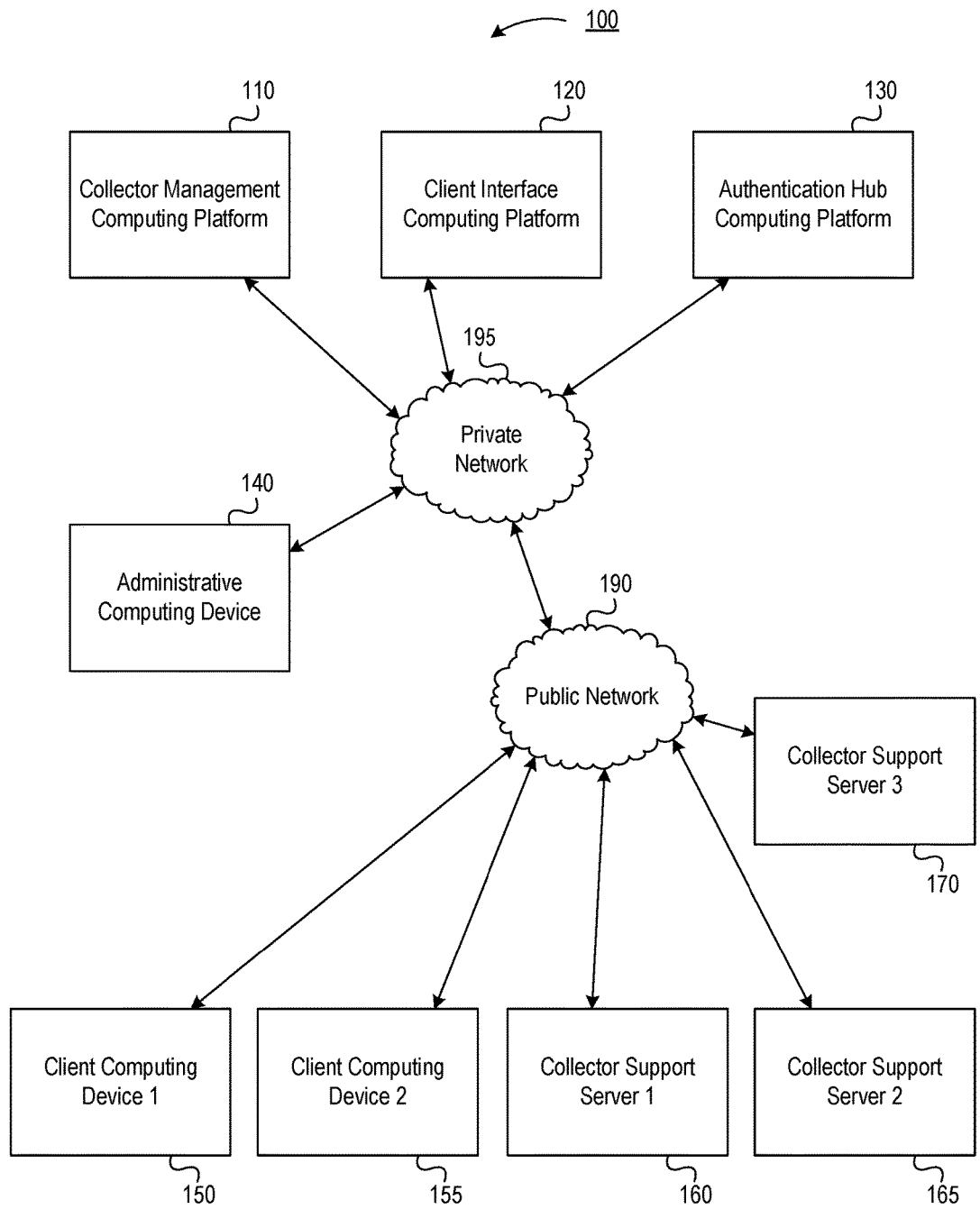
FIGS. 1A and 1B depict an illustrative computing environment for controlling device data collectors using omni-collection techniques in accordance with one or more example embodiments.
Figure 1B:
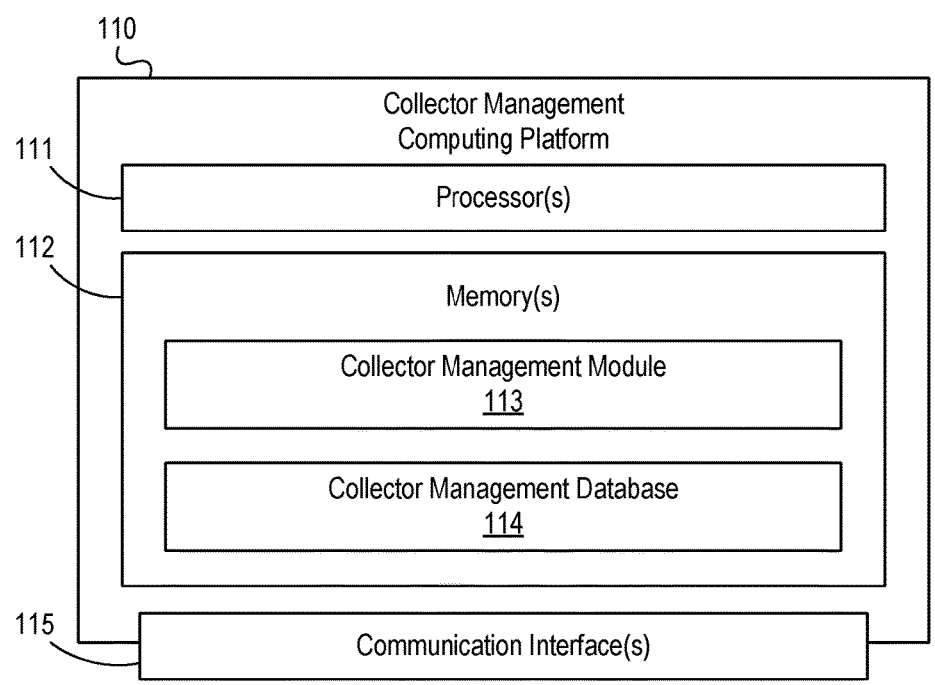

FIGS. 1A and 1B depict an illustrative computing environment for controlling device data collectors using omni-collection techniques in accordance with one or more example embodiments. Referring to FIG. 1A, computing environment 100 may include one or more computing devices and/or other computer systems. For example, computing environment 100 may include a collector management computing platform 110, a client interface computing platform 120, an authentication hub computing platform 130, an administrative computing device 140, a first client computing device 150, a second client computing device 155, a first collector support server 160, a second collector support server 165, and a third collector support server 170.

Collector management computing platform 110 may be configured to control one or more device data collectors and/or perform other functions, as discussed in greater detail below. Client interface computing platform 120 may be configured to provide one or more portal interfaces to one or more client devices. For example, client interface computing platform 120 may be configured to provide a customer portal, such as an online banking portal, to one or more customers of an organization, such as a financial institution, who may use one or more client computing devices to access the portal, such as client computing device 150 and client computing device 155. In some instances, in addition to being configured to provide an online banking portal associated with a financial institution to one or more customers of the financial institution and/or their associated computing devices, client interface computing platform 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like). In addition, client interface computing platform 120 may be configured to execute, maintain, and/or otherwise provide a native collector (which may, e.g., be used to collect and/or otherwise obtain device data and/or other information from one or more devices, including devices to which client interface computing platform 120 may serve one or more web pages and/or other interfaces, such as client computing device 150 and client computing device 155), as illustrated in greater detail below. Such a native collector may, for instance, include software instructions and/or other computer code that is executable by client interface computing platform 120 and/or embedded in one or more web pages and/or other interfaces that are generated, served, and/or otherwise provided by client interface computing platform 120 to one or more devices from which data is collected, such as client computing device 150 and/or client computing device 155.

Authentication hub computing platform 130 may be configured to authenticate one or more users and/or user devices to one or more interfaces. For example, authentication hub computing platform 130 may be configured to authenticate one or more users and/or user devices to a client portal and/or other client interfaces provided by client interface computing platform 120 and/or other computer systems associated with an organization operating collector management computing platform 110, client interface computing platform 120, and/or authentication hub computing platform 130. In some instances, authentication hub computing platform 130 may store, aggregate, and/or maintain device data obtained by one or more collectors, and authentication hub computing platform 130 may use such device data in authenticating one or more users and/or user devices to one or more interfaces, as illustrated in greater detail below.

Administrative computing device 140 may be configured to provide one or more interfaces that allow for configuration and management of one or more other computing devices and/or computer systems included in computing environment 100. For example, administrative computing device 140 may be configured to provide one or more interfaces that allow for configuration and management of one or more collectors, including a native collector provided by client interface computing platform 120, as illustrated in greater detail below.

Client computing device 150 may be configured to be used by a first customer of an organization, such as a customer of a financial institution. In some instances, client computing device 150 may, for example, be registered with the organization and/or one or more computer systems in computing environment 100, such that the organization and/or the one or more computer systems maintain one or more records linking client computing device 150 to the first customer of the organization. Client computing device 155 may be configured to be used by a second customer of the organization (who may, e.g., be different from the first customer of the organization). In some instances, client computing device 155 may, for example, be registered with the organization and/or one or more computer systems in computing environment 100, such that the organization and/or the one or more computer systems maintain one or more records linking client computing device 155 to the second customer of the organization.

Collector support server 160 may be configured to process data collected by a first device data collector and/or otherwise support operations of a first device data collector. In some instances, collector support server 160 may be controlled and/or operated by a first entity different from an organization operating collector management computing platform 110, client interface computing platform 120, and authentication hub computing platform 130, such as a vendor or other third-party entity providing data analysis services to the organization operating collector management computing platform 110, client interface computing platform 120, and authentication hub computing platform 130. Collector support server 165 may be configured to process data collected by a second device data collector and/or otherwise support operations of a second device data collector different from the first device data collector. In some instances, collector support server 165 may be controlled and/or operated by a second entity different from an organization operating collector management computing platform 110, client interface computing platform 120, and authentication hub computing platform 130, such as a vendor or other third-party entity providing data analysis services to the organization operating collector management computing platform 110, client interface computing platform 120, and authentication hub computing platform 130, and/or different from the first entity. Collector support server 170 may be configured to process data collected by a third device data collector and/or otherwise support operations of a third device data collector different from the first device data collector and/or the second device data collector. In some instances, collector support server 170 may be controlled and/or operated by a third entity different from an organization operating collector management computing platform 110, client interface computing platform 120, and authentication hub computing platform 130, such as a vendor or other third-party entity providing data analysis services to the organization operating collector management computing platform 110, client interface computing platform 120, and authentication hub computing platform 130, and/or different from the first entity and/or the second entity.

In one or more arrangements, client interface computing platform 120, authentication hub computing platform 130, administrative computing device 140, client computing device 150, client computing device 155, collector support server 160, collector support server 165, and collector support server 170 may be any type of computing device capable of receiving a user interface, receiving input via the user interface, and communicating the received input to one or more other computing devices. For example, client interface computing platform 120, authentication hub computing platform 130, administrative computing device 140, client computing device 150, client computing device 155, collector support server 160, collector support server 165, and collector support server 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client interface computing platform 120, authentication hub computing platform 130, administrative computing device 140, client computing device 150, client computing device 155, collector support server 160, collector support server 165, and collector support server 170 may, in some instances, be special-purpose computing devices configured to perform specific functions.

Computing environment 100 also may include one or more computing platforms. For example, computing environment 100 may include collector management computing platform 110. As illustrated in greater detail below, collector management computing platform 110 may include one or more computing devices configured to perform one or more of the functions described herein. For example, collector management computing platform 110 may include one or more computers (e.g., laptop computers, desktop computers, servers, server blades, or the like).

Computing environment 100 also may include one or more networks, which may interconnect one or more of collector management computing platform 110, client interface computing platform 120, authentication hub computing platform 130, administrative computing device 140, client computing device 150, client computing device 155, collector support server 160, collector support server 165, and collector support server 170. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, collector management computing platform 110, client interface computing platform 120, authentication hub computing platform 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect collector management computing platform 110, client interface computing platform 120, authentication hub computing platform 130, and administrative computing device 140 and one or more other computing devices and/or computer systems that are used by, operated by, and/or otherwise associated with the organization. Public network 190 may connect private network 195 and/or one or more computing devices connected thereto (e.g., collector management computing platform 110, client interface computing platform 120, authentication hub computing platform 130, and administrative computing device 140) with one or more networks and/or computing devices that are not associated with the organization. For example, client computing device 150, client computing device 155, collector support server 160, collector support server 165, and collector support server 170 might not be associated with an organization that operates private network 195 (e.g., because client computing device 150, client computing device 155, collector support server 160, collector support server 165, and collector support server 170 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 155, collector support server 160, collector support server 165, and collector support server 170 to private network 195 and/or one or more computing devices connected thereto (e.g., collector management computing platform 110, client interface computing platform 120, authentication hub computing platform 130, and administrative computing device 140).

Referring to FIG. 1B, collector management computing platform 110 may include one or more processors 111, memory 112, and communication interface 115. A data bus may interconnect processor(s) 111, memory 112, and communication interface 115. Communication interface 115 may be a network interface configured to support communication between collector management computing platform 110 and one or more networks (e.g., private network 195, public network 190, or the like). Memory 112 may include one or more program modules having instructions that when executed by processor(s) 111 cause collector management computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of collector management computing platform 110 and/or by different computing devices that may form and/or otherwise make up collector management computing platform 110. For example, memory 112 may have, store, and/or include a collector management module 113 and a collector management database 114. Collector management module 113 may have instructions that direct and/or cause collector management computing platform 110 to control one or more device data collectors and/or to perform other functions, as discussed in greater detail below. Collector management database 114 may store information used by collector management module 113 and/or collector management computing platform 110 in controlling one or more device data collectors and/or in performing other functions.

Figure 2A:
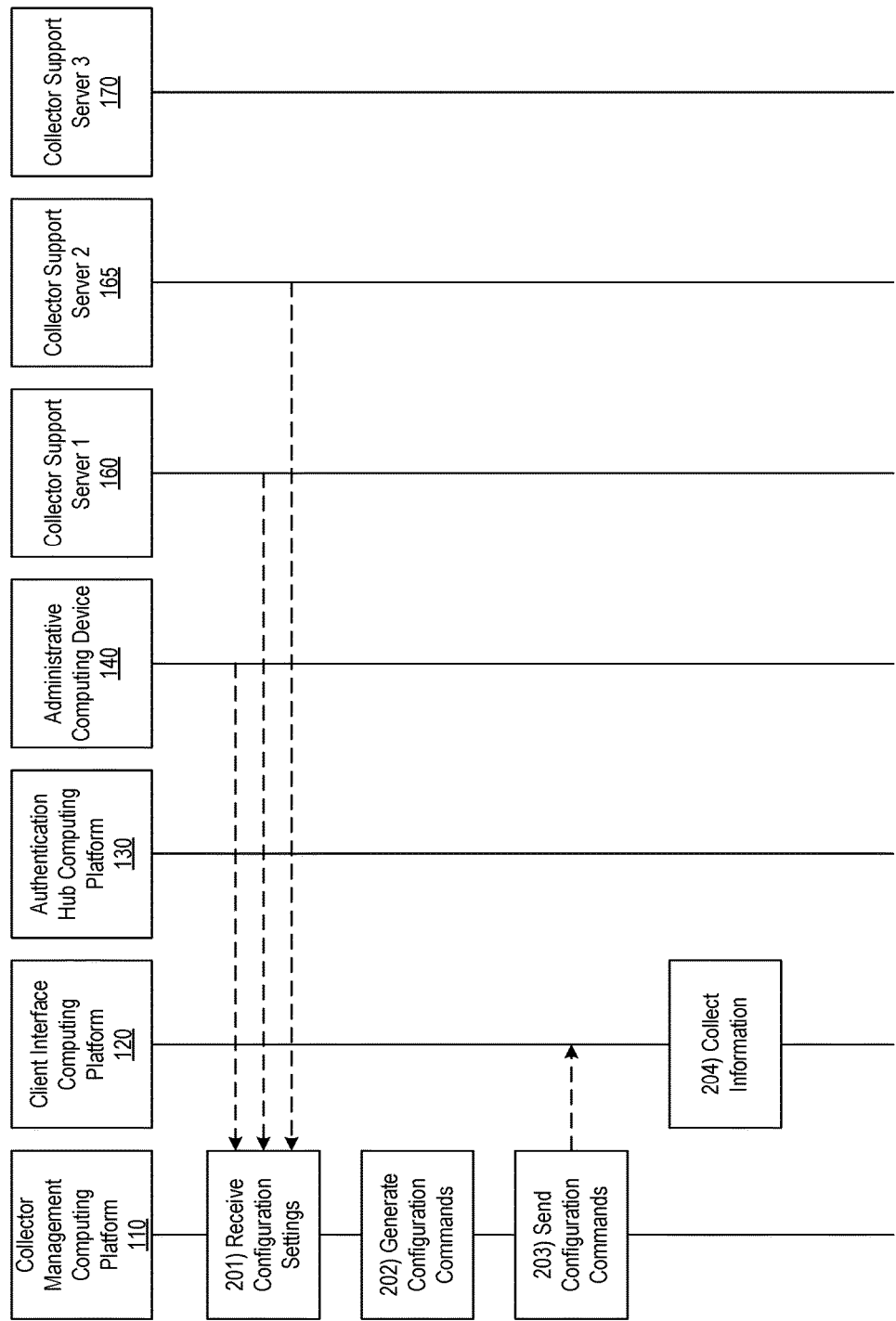

FIGS. 2A-2F depict an illustrative event sequence for controlling device data collectors using omni-collection techniques in accordance with one or more example embodiments. Referring to FIG. 2A, at step 201, collector management computing platform 110 may receive one or more configuration settings. For example, at step 201, collector management computing platform 110 may receive first configuration settings associated with a first collector and second configuration settings associated with a second collector. The configuration settings may, for instance, define one or more data elements needed by each collector, one or more pages and/or other interfaces where each collector may collect the one or more data elements needed by each collector, version information of each collector, and/or other information associated with each collector. In some instances, the configuration settings may be manually defined by a user via a user interface (which may, e.g., be presented by administrative computing device 140) and received by collector management computing platform 110 from another computing device (e.g., administrative computing device 140). In some instances, the configuration settings may be automatically detected by collector management computing platform 110 and/or by a utility executed on collector management computing platform 110, which may scan each collector to identify the configuration settings for each collector and/or receive and/or analyze one or more collector definition files to identify the configuration settings for each collector.

In some embodiments, the first configuration settings associated with the first collector may define a first set of data elements requested by the first collector, and the second configuration settings associated with the second collector may define a second set of data elements requested by the second collector. For example, the first configuration settings associated with the first collector (which may, e.g., be associated with collector support server 160) may define a first set of data elements requested by the first collector, and the second configuration settings associated with the second collector (which may, e.g., be associated with collector support server 165) may define a second set of data elements requested by the second collector. For example, the first set of data elements requested by the first collector may include a device identifier of a device being inspected and/or analyzed by the first collector, a network address of the device being inspected and/or analyzed by the first collector, an application inventory of the device being inspected and/or analyzed by the first collector, and/or other data elements. The second set of data elements requested by the second collector may, for example, include a device identifier of a device being inspected and/or analyzed by the second collector, a network address of the device being inspected and/or analyzed by the second collector, a current location of the device being inspected and/or analyzed by the second collector, and/or other data elements. Any and/or all of these data elements may be used by the first collector, collector support server 160, the second collector, and/or collector support server 165 in analyzing a particular device, for example, to determine a risk state of the particular device (which may, e.g., subsequently be used by other systems in performing other functions, such as being used by authentication hub computing platform 130 in allowing or denying access to account information and/or other resources, as illustrated in greater detail below).

In some embodiments, the first configuration settings associated with the first collector may include first version information identifying a version of the first collector, and the second configuration settings associated with the second collector may include second version information identifying a version of the second collector. For example, the first configuration settings associated with the first collector (which may, e.g., be received by collector management computing platform 110 at step 201) may include first version information identifying a version of the first collector, and the second configuration settings associated with the second collector (which may, e.g., be received by collector management computing platform 110 at step 201) may include second version information identifying a version of the second collector.

At step 202, collector management computing platform 110 may generate one or more configuration commands for a native collector. For example, at step 202, collector management computing platform 110 may generate one or more configuration commands for a native collector based on the first configuration settings associated with the first collector and the second configuration settings associated with the second collector. The native collector may, for example, be hosted on, executed by, and/or otherwise provided by client interface computing platform 120 and may be used to implement omni-collection techniques in which the native collector collects all of the data elements requested by all of the device data collectors being used with respect to each particular device being analyzed, rather than allowing each collector to individually collect its requested data elements with respect to each particular device being analyzed, so as to reduce redundancy and improve system performance and computing resource usage in instances in which multiple collectors request one or more of the same data elements. In other words, in instances where the first collector and the second collector request one or more redundant or overlapping data elements, the native collector may be used to collect each of the overlapping data elements (and any other non-overlapping data elements needed by each collector) only once, thereby improving allocation and usage of computing resources and system performance.

In some embodiments, generating the one or more configuration commands for the native collector based on the first configuration settings associated with the first collector and the second configuration settings associated with the second collector may include: generating at least one command for the native collector directing the native collector to collect one or more data elements requested by the first collector; and generating at least one command for the native collector directing the native collector to collect one or more data elements requested by the second collector. For example, in generating the one or more configuration commands for the native collector based on the first configuration settings associated with the first collector (which may, e.g., be associated with collector support server 160) and the second configuration settings associated with the second collector (which may, e.g., be associated with collector support server 165) at step 202, collector management computing platform 110 may generate at least one command for the native collector directing the native collector to collect one or more data elements requested by the first collector, such as a device identifier of a device to be inspected and/or analyzed by the first collector, a network address of the device to be inspected and/or analyzed by the first collector, an application inventory of the device to be inspected and/or analyzed by the first collector, and/or other any other data elements requested by the first collector. In addition, in generating the one or more configuration commands for the native collector based on the first configuration settings associated with the first collector (which may, e.g., be associated with collector support server 160) and the second configuration settings associated with the second collector (which may, e.g., be associated with collector support server 165) at step 202, collector management computing platform 110 may generate at least one command for the native collector directing the native collector to collect one or more data elements requested by the second collector, such as a device identifier of a device to be inspected and/or analyzed by the second collector, a network address of the device to be inspected and/or analyzed by the second collector, a current location of the device to be inspected and/or analyzed by the second collector, and/or other any other data elements requested by the second collector.

At step 203, collector management computing platform 110 may send the one or more configuration commands generated for the native collector to client interface computing platform 120 (which may, e.g., host, execute, and/or otherwise provide the native collector). For example, at step 203, collector management computing platform 110 may send, via the communication interface (e.g., communication interface 115), to a client interface computing platform associated with the native collector (e.g., client interface computing platform 120), the one or more configuration commands generated for the native collector. For instance, collector management computing platform 110 may send one or more configuration commands to client interface computing platform 120 directing the native collector to collect one or more data elements requested by and/or otherwise associated with the first collector and the second collector.

At step 204, client interface computing platform 120 may collect state information from one or more devices. For example, at step 204, client interface computing platform 120 and/or the native collector hosted on, executed on, and/or otherwise provided by client interface computing platform 120 may collect device data and/or other state information from one or more devices (e.g., based on the one or more configuration commands generated for the native collector by collector management computing platform 110 and sent by collector management computing platform 110 to client interface computing platform 120 at step 203). For instance, client interface computing platform 120 and/or the native collector hosted on, executed on, and/or otherwise provided by client interface computing platform 120 may collect device data and/or other state information from one or more devices (e.g., client computing device 150, client computing device 155, and/or other devices) as various webpages, client portal user interfaces, and/or other client interfaces are requested by, generated for, served to, and/or otherwise provided to various client devices, such as client computing device 150 and client computing device 155.

Figure 2B:
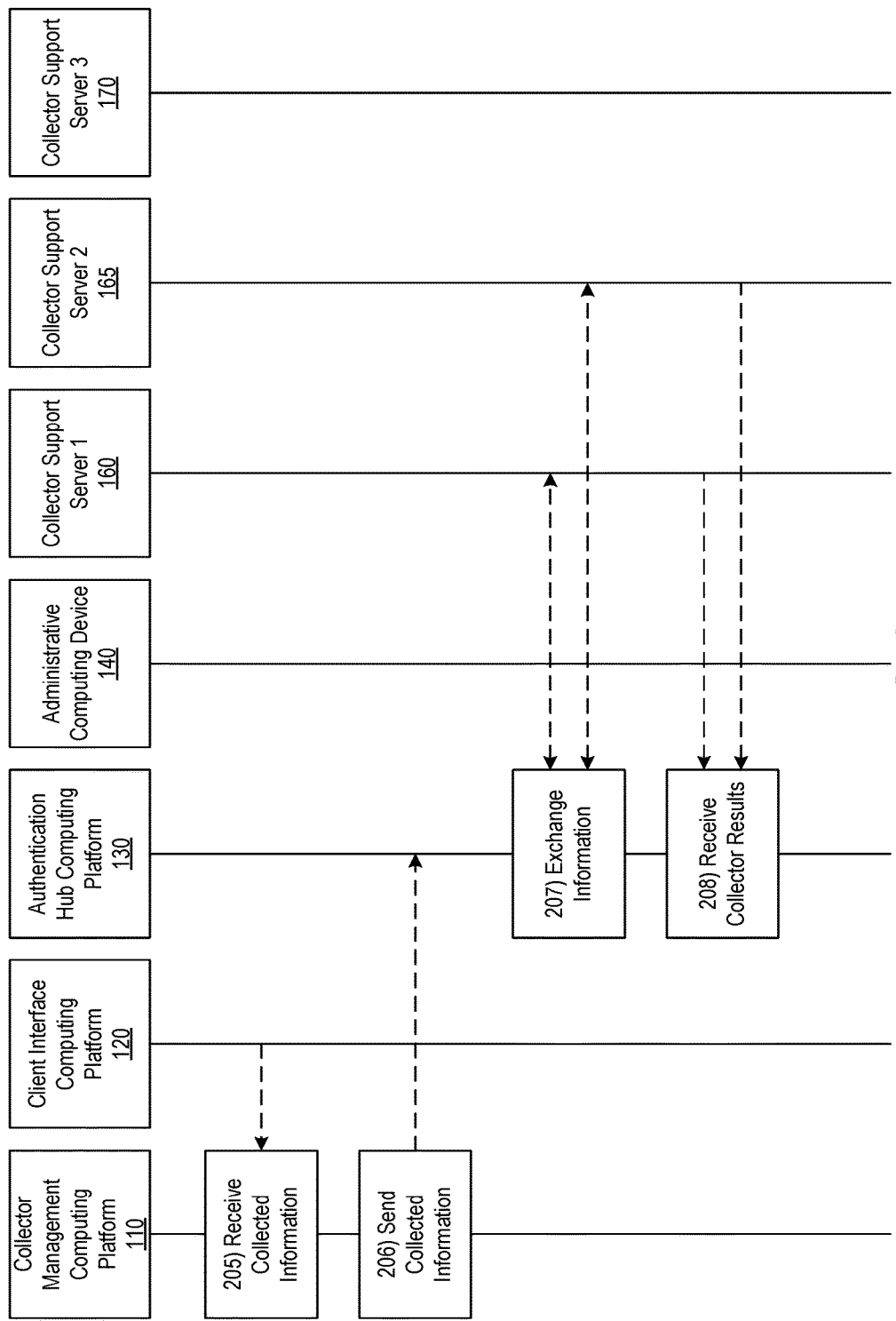

Referring to FIG. 2B, at step 205, collector management computing platform 110 may receive state information from client interface computing platform 120 and/or the native collector hosted on and/or provided by client interface computing platform 120. For example, at step 205, collector management computing platform 110 may receive, via the communication interface (e.g., communication interface 115), from the client interface computing platform associated with the native collector (e.g., client interface computing platform 120), state information collected by the native collector based on the one or more configuration commands generated for the native collector. Such state information may, for instance, include device data and/or other state information collected by client interface computing platform 120 and/or the native collector hosted on, executed on, and/or otherwise provided by client interface computing platform 120 from one or more devices, such as client computing device 150 and/or client computing device 155, based on the one or more configuration commands generated for the native collector by collector management computing platform 110.

At step 206, collector management computing platform 110 may send state information to authentication hub computing platform 130. For example, at step 206, collector management computing platform 110 may send, via the communication interface (e.g., communication interface 115), to an authentication hub computing platform (e.g., authentication hub computing platform 130), the state information received from the client interface computing platform associated with the native collector (e.g., client interface computing platform 120). In addition, sending the state information received from the client interface computing platform associated with the native collector to the authentication hub computing platform may cause the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector. For example, in sending the state information received from the client interface computing platform associated with the native collector (e.g., client interface computing platform 120) to the authentication hub computing platform (e.g., authentication hub computing platform 130), collector management computing platform 110 may direct and/or otherwise cause the authentication hub computing platform (e.g., authentication hub computing platform 130) to share at least a portion of the state information received from the client interface computing platform associated with the native collector (e.g., client interface computing platform 120) with one or more of a first collector support server associated with the first collector (e.g., collector support server 160) for processing by the first collector support server associated with the first collector (e.g., collector support server 160) or a second collector support server associated with the second collector (e.g., collector support server 165) for processing by the second collector support server associated with the second collector (e.g., collector support server 165). For instance, collector management computing platform 110 may direct and/or otherwise cause authentication hub computing platform 130 to store and/or aggregate device data information and/or other state information collected by the native collector, and/or collector management computing platform 110 may direct and/or otherwise cause authentication hub computing platform 130 to share device data information and/or other state information collected by the native collector with one or more collector support servers (e.g., collector support server 160, collector support server 165).

In some embodiments, sending the state information received from the client interface computing platform associated with the native collector to the authentication hub computing platform may include sending at least one command to the authentication hub computing platform directing the authentication hub computing platform to aggregate device data collected by the native collector for processing by one or more collector support servers. For example, in sending the state information received from the client interface computing platform associated with the native collector (e.g., client interface computing platform 120) to the authentication hub computing platform (e.g., authentication hub computing platform 130), collector management computing platform 110 may send at least one command to the authentication hub computing platform (e.g., authentication hub computing platform 130) directing the authentication hub computing platform (e.g., authentication hub computing platform 130) to aggregate device data collected by the native collector for processing by one or more collector support servers (e.g., collector support server 160, collector support server 165).

In some embodiments, sending the state information received from the client interface computing platform associated with the native collector to the authentication hub computing platform may include sending at least one command to the authentication hub computing platform directing the authentication hub computing platform to send device data collected by the native collector to at least one collector support server for processing by the at least one collector support server. For example, in sending the state information received from the client interface computing platform associated with the native collector (e.g., client interface computing platform 120) to the authentication hub computing platform (e.g., authentication hub computing platform 130), collector management computing platform 110 may send at least one command to the authentication hub computing platform (e.g., authentication hub computing platform 130) directing the authentication hub computing platform (e.g., authentication hub computing platform 130) to send device data collected by the native collector to at least one collector support server (e.g., collector support server 160, collector support server 165) for processing by the at least one collector support server (e.g., collector support server 160, collector support server 165).

At step 207, authentication hub computing platform 130 may exchange state information with one or more collector support servers (e.g., collector support server 160, collector support server 165). For example, at step 207, authentication hub computing platform 130 may send, receive, and/or otherwise exchange device data and/or other state information with one or more collector support servers (e.g., collector support server 160, collector support server 165). Authentication hub computing platform 130 may, for instance, send, receive, and/or otherwise exchange the device data and/or other state information with the one or more collector support servers (e.g., collector support server 160, collector support server 165) automatically and/or in response to requests for the device data and/or other state information received by authentication hub computing platform 130 from the one or more collector support servers (e.g., collector support server 160, collector support server 165).

In some embodiments, the authentication hub computing platform may be configured to receive collector results data from the first collector support server associated with the first collector and the second collector support server associated with the second collector, and the authentication hub computing platform may be configured to process one or more authentication requests based on the collector results data received from the first collector support server associated with the first collector and the second collector support server associated with the second collector. For example, the authentication hub computing platform (e.g., authentication hub computing platform 130) may be configured to receive collector results data from the first collector support server associated with the first collector (e.g., collector support server 160) and the second collector support server associated with the second collector (e.g., collector support server 165), as illustrated in greater detail below. In addition, the authentication hub computing platform (e.g., authentication hub computing platform 130) may, for example, be configured to process one or more authentication requests (which may, e.g., be received from client computing device 150, client computing device 155, and/or one or more other client computing devices) based on the collector results data received from the first collector support server associated with the first collector (e.g., collector support server 160) and the second collector support server associated with the second collector (e.g., collector support server 165), as illustrated in greater detail below.

At step 208, authentication hub computing platform 130 may receive collector results data from the one or more collector support servers (e.g., collector support server 160, collector support server 165). For example, at step 208, authentication hub computing platform 130 may receive collector results data from the one or more collector support servers (e.g., collector support server 160, collector support server 165) that includes the output of analysis processes and/or other processing performed by the one or more collector support servers (e.g., collector support server 160, collector support server 165) on the device data and/or other state information collected by the native collector. Such collector results data received from the one or more collector support servers (e.g., collector support server 160, collector support server 165) may, for example, include device risk information, device security state information, and/or other information determined by the one or more collector support servers (e.g., collector support server 160, collector support server 165) based on the device data and/or other state information collected by the native collector. In addition, authentication hub computing platform 130 may aggregate and/or otherwise store the collector results data received from the one or more collector support servers (e.g., collector support server 160, collector support server 165) in one or more databases, including one or more authentication databases used by authentication hub computing platform 130 in processing authentication requests received from various client devices (e.g., client computing device 150, client computing device 155).

Figure 2C:
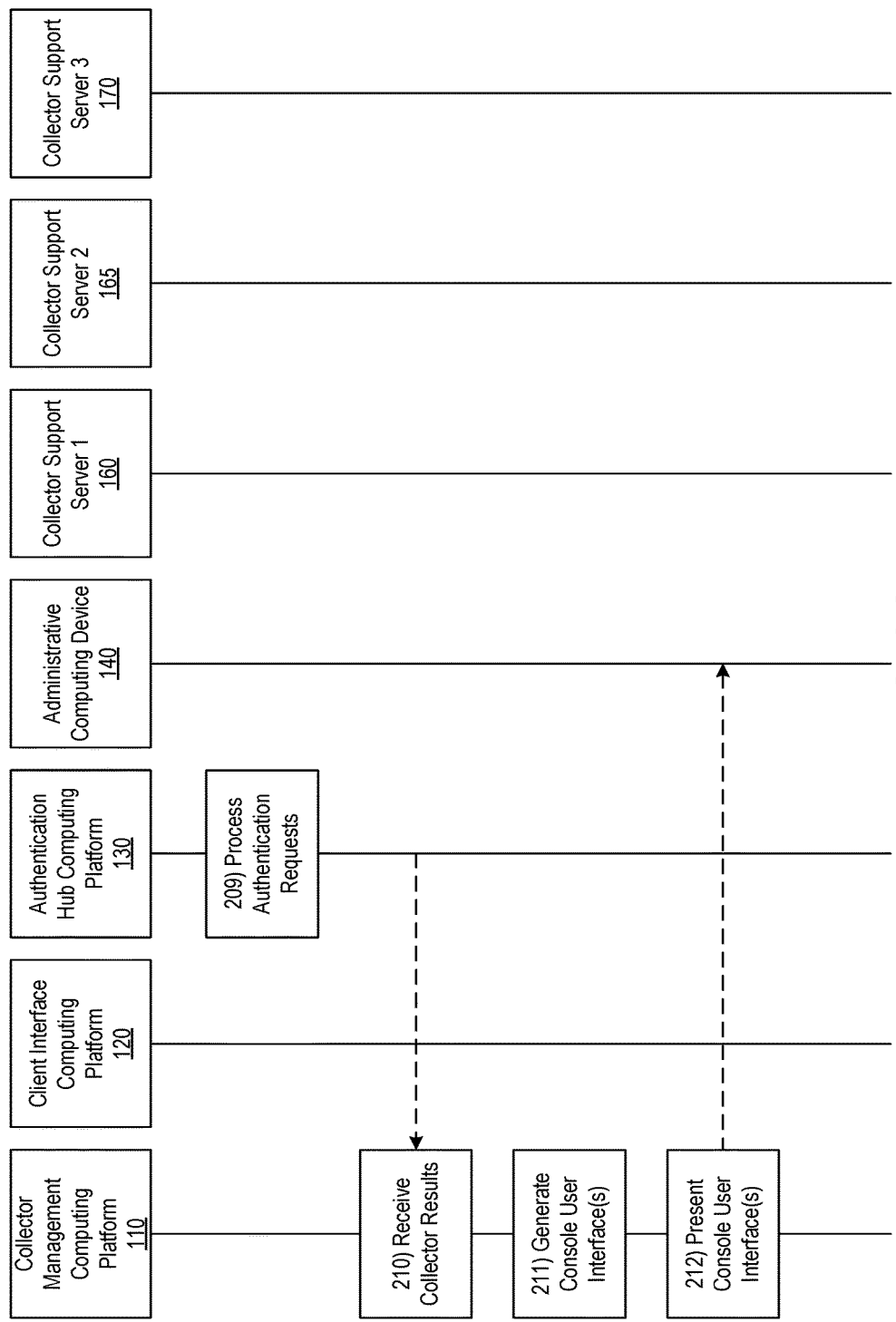

Referring to FIG. 2C, at step 209, authentication hub computing platform 130 may process one or more authentication requests. For example, at step 209, authentication hub computing platform 130 may process one or more authentication requests from one or more client devices, such as client computing device 150, client computing device 155, and/or one or more other client devices, based on the collector results data received by authentication hub computing platform 130 from the one or more collector support servers (e.g., collector support server 160, collector support server 165). In processing the one or more authentication requests from the one or more client devices based on the collector results data received by authentication hub computing platform 130 from the one or more collector support servers (e.g., collector support server 160, collector support server 165), authentication hub computing platform 130 may, for instance, allow and/or deny access to one or more resources and/or interfaces (e.g., an online banking portal and/or mobile banking portal provided by client interface computing platform 120) based on the collector results data received by authentication hub computing platform 130 from the one or more collector support servers (e.g., collector support server 160, collector support server 165).

At step 210, collector management computing platform 110 may receive collector results data from authentication hub computing platform 130. For example, at step 210, collector management computing platform 110 may receive, via the communication interface (e.g., communication interface 115), from the authentication hub computing platform (e.g., authentication hub computing platform 130), collector results information comprising first collector results information associated with the first collector and second collector results information associated with the second collector. In some instances, collector management computing platform 110 may receive collector results data from authentication hub computing platform 130 automatically, for example, as authentication hub computing platform 130 receives collector results data from the one or more collector support servers (e.g., collector support server 160, collector support server 165). In some instances, collector management computing platform 110 may receive collector results data from authentication hub computing platform 130 based on a predefined schedule and/or periodic monitoring. In some instances, collector management computing platform 110 may receive collector results data from authentication hub computing platform 130 based on a request to obtain and/or receive collector results data from authentication hub computing platform 130.

At step 211, collector management computing platform 110 may generate one or more console user interfaces. For example, at step 211, collector management computing platform 110 may generate a collector console user interface based on the collector results information received from the authentication hub computing platform (e.g., authentication hub computing platform 130). At step 212, collector management computing platform 110 may present the one or more console user interfaces. For example, at step 212, collector management computing platform 110 may cause the collector console user interface (e.g., generated at step 211) to be presented on an administrative computing device (e.g., administrative computing device 140).

Figure 3:
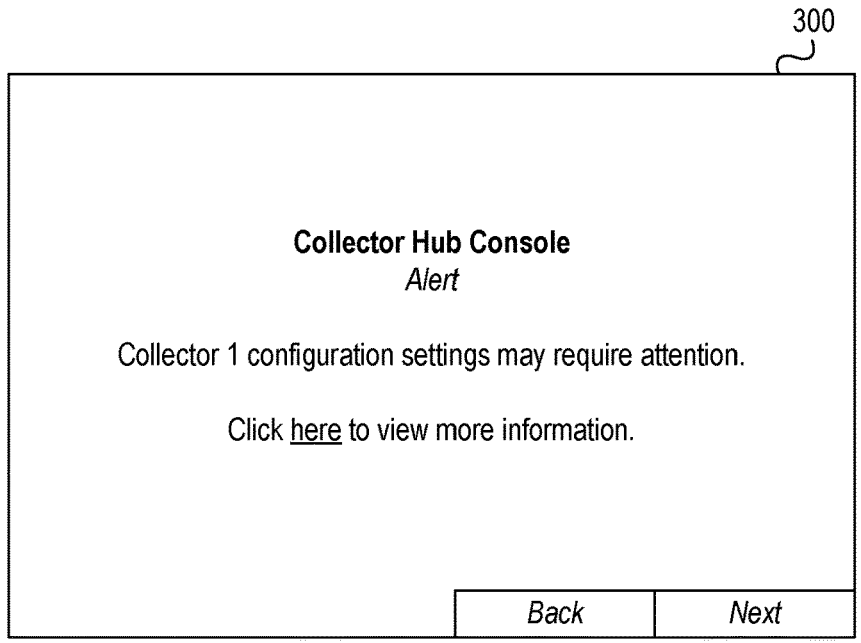
FIGS. 3-6 depict example graphical user interfaces for controlling device data collectors using omni-collection techniques in accordance with one or more example embodiments.

In some embodiments, generating the collector console user interface based on the collector results information received from the authentication hub computing platform may include generating a collector alert user interface. For example, in generating the collector console user interface based on the collector results information received from the authentication hub computing platform (e.g., authentication hub computing platform 130), collector management computing platform 110 may generate a collector alert user interface. In generating a collector alert user interface and/or causing the collector alert user interface to be presented (e.g., by administrative computing device 140), collector management computing platform 110 may, for instance, generate and/or cause administrative computing device 140 to display and/or otherwise present a graphical user interface similar to graphical user interface 300, which is illustrated in FIG. 3. As seen in FIG. 3, graphical user interface 300 may include text and/or other information indicating an alert or notification associated with one or more collectors (e.g., "Collector 1 configuration settings may require attention") and/or one or more controls allowing a user interacting with graphical user interface 300 to view and/or access information associated with the alert or notification (e.g., "Click here to view more information").

Figure 4:
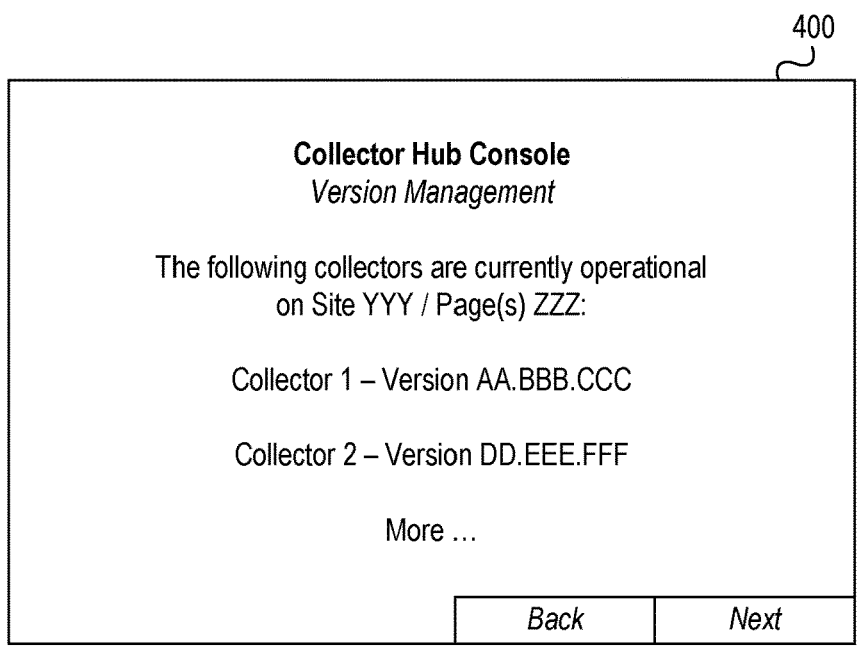

In some embodiments, generating the collector console user interface based on the collector results information received from the authentication hub computing platform may include generating a collector version management user interface. For example, in generating the collector console user interface based on the collector results information received from the authentication hub computing platform (e.g., authentication hub computing platform 130), collector management computing platform 110 may generate a collector version management user interface. In generating a collector version management user interface and/or in causing the collector version management user interface to be presented (e.g., by administrative computing device 140), collector management computing platform 110 may, for instance, generate and/or cause administrative computing device 140 to display and/or otherwise present a graphical user interface similar to graphical user interface 400, which is illustrated in FIG. 4. As seen in FIG. 4, graphical user interface 400 may include text and/or other information identifying collectors that are currently in use, what pages such collectors are active on, what versions of the collectors are in use, and/or the like (e.g., "The following collectors are currently operational on Site YYY/Page(s) ZZZ: Collector 1—Version AA.BBB.CCC; Collector 2—Version DD.EE-E.FFF") and/or one or more controls allowing a user interacting with graphical user interface 400 to view and/or modify settings and/or other information associated with collectors, including modifying which collectors are active or in use on specific pages.

Figure 5:
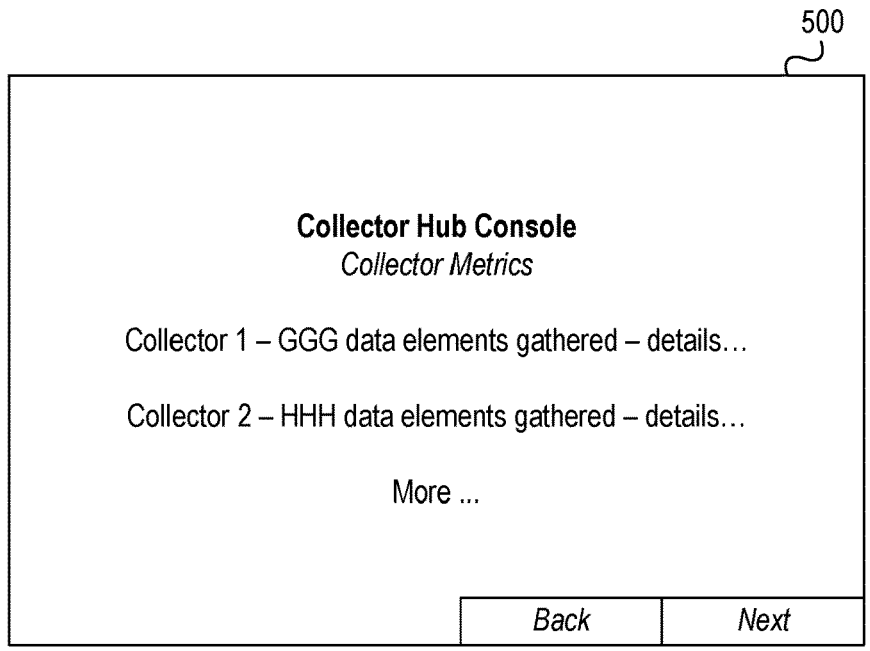

In some embodiments, generating the collector console user interface based on the collector results information received from the authentication hub computing platform may include generating a collector metrics user interface. For example, in generating the collector console user interface based on the collector results information received from the authentication hub computing platform (e.g., authentication hub computing platform 130), collector management computing platform 110 may generate a collector metrics user interface. In generating a collector metrics user interface and/or in causing the collector metrics user interface to be presented (e.g., by administrative computing device 140), collector management computing platform 110 may, for instance, generate and/or cause administrative computing device 140 to display and/or otherwise present a graphical user interface similar to graphical user interface 500, which is illustrated in FIG. 5. As seen in FIG. 5, graphical user interface 500 may include text and/or other information identifying collectors that are currently in use, as well as performance metrics and/or other information associated with the collectors (e.g., "Collector 1—GGG data elements gathered—details . . . ; Collector 2—HHH data elements gathered—details . . . ") and/or one or more controls allowing a user interacting with graphical user interface 500 to view and/or modify settings and/or other information associated with collectors.

Figure 2D:
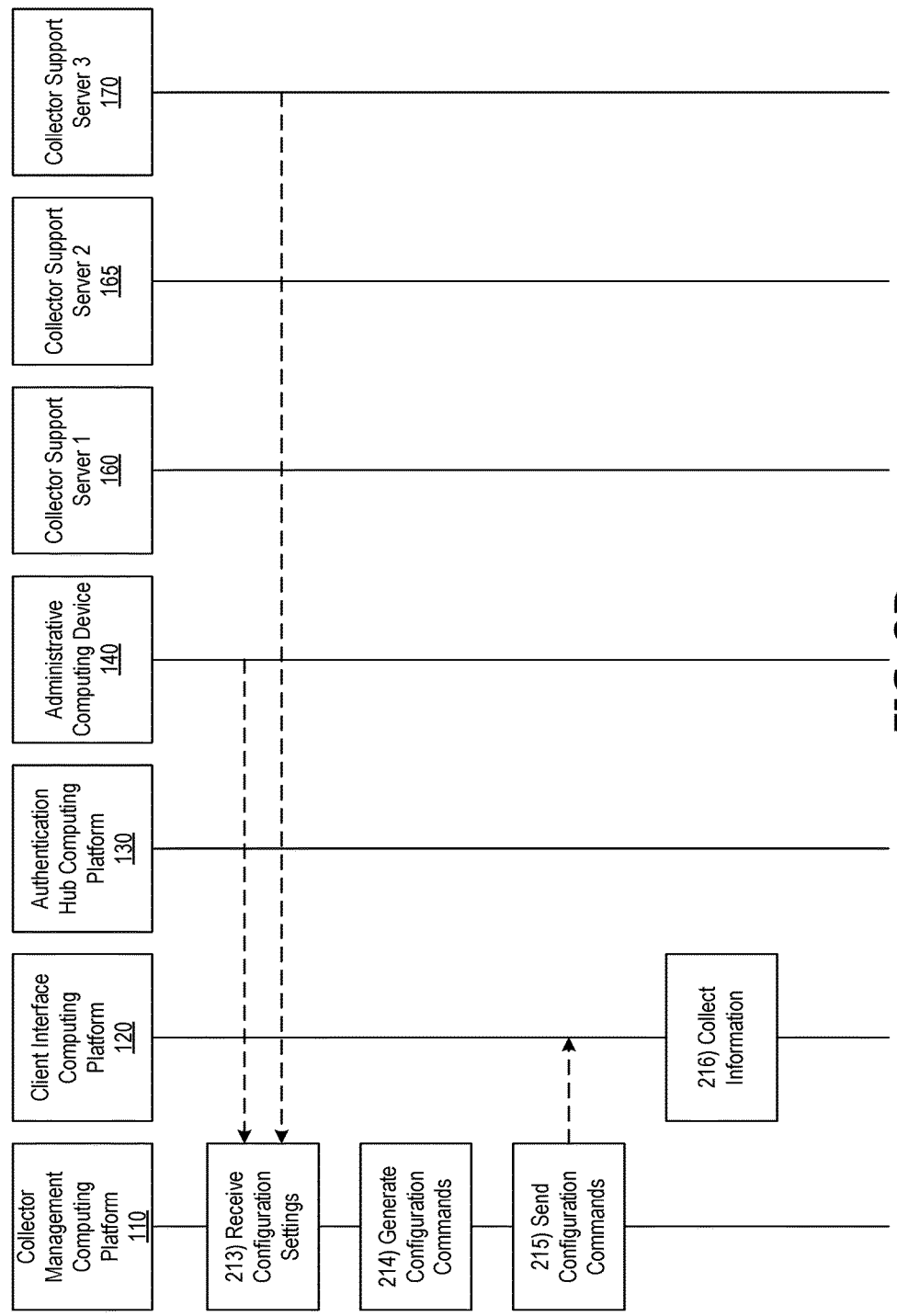

Referring to FIG. 2D, at step 213, collector management computing platform 110 may receive one or more additional configuration settings associated with an additional collector. For example, at step 213, collector management computing platform 110 may receive third configuration settings associated with a third collector. The configuration settings may, for instance, define one or more data elements needed by the third collector, one or more pages and/or other interfaces where the third collector may collect the one or more data elements needed by the third collector, version information of the third collector, and/or other information associated with the third collector. In some instances, the configuration settings may be manually defined by a user via a user interface (which may, e.g., be presented by administrative computing device 140) and received by collector management computing platform 110 from another computing device (e.g., administrative computing device 140). In some instances, the configuration settings may be automatically detected by collector management computing platform 110 and/or by a utility executed on collector management computing platform 110, which may scan the third collector to identify the configuration settings for the third collector and/or receive and/or analyze one or more collector definition files to identify the configuration settings for the third collector.

At step 214, collector management computing platform 110 may generate one or more configuration commands for the native collector. For example, at step 214, collector management computing platform 110 may generate one or more additional configuration commands for the native collector based on the third configuration settings associated with the third collector. In generating the one or more additional configuration commands for the native collector based on the third configuration settings associated with the third collector (which may, e.g., be associated with collector support server 170) at step 214, collector management computing platform 110 may generate at least one command for the native collector directing the native collector to collect one or more data elements requested by the third collector, such as a device identifier of a device to be inspected and/or analyzed by the third collector, a network address of the device to be inspected and/or analyzed by the third collector, an application inventory of the device to be inspected and/or analyzed by the third collector, and/or other any other data elements requested by the third collector. In addition, in some instances, the one or more additional configuration commands generated by collector management computing platform 110 for the native collector based on the third configuration settings associated with the third collector may direct the native collector to collect data elements requested by the third collector and continue collecting data elements requested by the first collector and/or the second collector. In other instances, the one or more additional configuration commands generated by collector management computing platform 110 for the native collector based on the third configuration settings associated with the third collector may direct the native collector to collect data elements requested by the third collector and discontinue collecting data elements requested by the first collector and/or the second collector.

At step 215, collector management computing platform 110 may send the one or more configuration commands generated for the native collector to client interface computing platform 120 (which may, e.g., host, execute, and/or otherwise provide the native collector). For example, at step 215, collector management computing platform 110 may send, via the communication interface (e.g., communication interface 115), to the client interface computing platform associated with the native collector (e.g., client interface computing platform 120), the one or more additional configuration commands generated for the native collector. For instance, collector management computing platform 110 may send one or more configuration commands to client interface computing platform 120 directing the native collector to collect one or more data elements requested by and/or otherwise associated with the third collector.

At step 216, client interface computing platform 120 may collect state information from one or more devices. For example, at step 216, client interface computing platform 120 and/or the native collector hosted on, executed on, and/or otherwise provided by client interface computing platform 120 may collect device data and/or other state information from one or more devices (e.g., based on the one or more configuration commands generated for the native collector by collector management computing platform 110 and sent by collector management computing platform 110 to client interface computing platform 120 at step 203 and/or based on the one or more additional configuration commands generated for the native collector by collector management computing platform 110 and sent by collector management computing platform 110 to client interface computing platform 120 at step 215). For instance, client interface computing platform 120 and/or the native collector hosted on, executed on, and/or otherwise provided by client interface computing platform 120 may collect device data and/or other state information from one or more devices (e.g., client computing device 150, client computing device 155, and/or other devices) as various webpages, client portal user interfaces, and/or other client interfaces are requested by, generated for, served to, and/or otherwise provided to various client devices, such as client computing device 150 and client computing device 155.

Figure 2E:
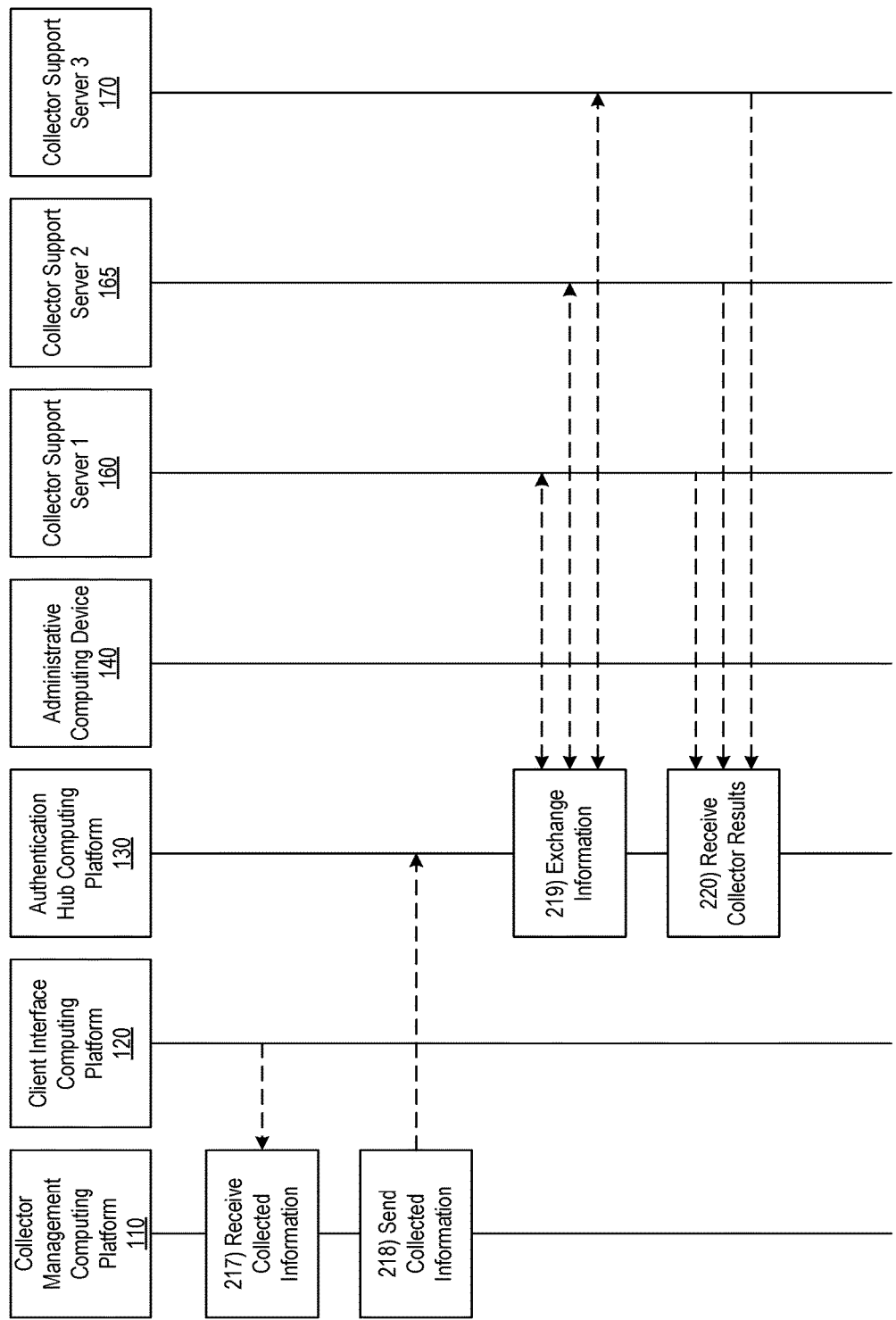

Referring to FIG. 2E, at step 217, collector management computing platform 110 may receive state information from client interface computing platform 120 and/or the native collector hosted on and/or provided by client interface computing platform 120. For example, at step 217, collector management computing platform 110 may receive, via the communication interface (e.g., communication interface 115), from the client interface computing platform associated with the native collector (e.g., client interface computing platform 120), additional state information collected by the native collector based on the one or more additional configuration commands generated for the native collector. Such state information may, for instance, include device data and/or other state information collected by client interface computing platform 120 and/or the native collector hosted on, executed on, and/or otherwise provided by client interface computing platform 120 from one or more devices, such as client computing device 150 and/or client computing device 155, based on the one or more configuration commands generated for the native collector by collector management computing platform 110 and/or based on the one or more additional configuration commands generated for the native collector by collector management computing platform 110.

At step 218, collector management computing platform 110 may send state information to authentication hub computing platform 130. For example, at step 218, collector management computing platform 110 may send, via the communication interface (e.g., communication interface 115), to the authentication hub computing platform (e.g., authentication hub computing platform 130), the additional state information received from the client interface computing platform associated with the native collector (e.g., client interface computing platform 120). In addition, sending the additional state information received from the client interface computing platform associated with the native collector to the authentication hub computing platform may cause the authentication hub computing platform to share at least a portion of the additional state information received from the client interface computing platform associated with the native collector with a third collector support server associated with the third collector for processing by the third collector support server associated with the third collector. For example, in sending the additional state information received from the client interface computing platform associated with the native collector (e.g., client interface computing platform 120) to the authentication hub computing platform (e.g., authentication hub computing platform 130), collector management computing platform 110 may cause the authentication hub computing platform (e.g., authentication hub computing platform 130) to share at least a portion of the additional state information received from the client interface computing platform associated with the native collector (e.g., client interface computing platform 120) with a third collector support server associated with the third collector (e.g., collector support server 170) for processing by the third collector support server associated with the third collector (e.g., collector support server 170). For instance, collector management computing platform 110 may direct and/or otherwise cause authentication hub computing platform 130 to store and/or aggregate device data information and/or other state information collected by the native collector, and/or collector management computing platform 110 may direct and/or otherwise cause authentication hub computing platform 130 to share device data information and/or other state information collected by the native collector with one or more collector support servers (e.g., collector support server 160, collector support server 165, collector support server 170).

At step 219, authentication hub computing platform 130 may exchange state information with one or more collector support servers (e.g., collector support server 160, collector support server 165, collector support server 170). For example, at step 219, authentication hub computing platform 130 may send, receive, and/or otherwise exchange device data and/or other state information with one or more collector support servers (e.g., collector support server 160, collector support server 165, collector support server 170). Authentication hub computing platform 130 may, for instance, send, receive, and/or otherwise exchange the device data and/or other state information with the one or more collector support servers (e.g., collector support server 160, collector support server 165, collector support server 170) automatically and/or in response to requests for the device data and/or other state information received by authentication hub computing platform 130 from the one or more collector support servers (e.g., collector support server 160, collector support server 165, collector support server 170).

At step 220, authentication hub computing platform 130 may receive collector results data from the one or more collector support servers (e.g., collector support server 160, collector support server 165, collector support server 170). For example, at step 220, authentication hub computing platform 130 may receive collector results data from the one or more collector support servers (e.g., collector support server 160, collector support server 165, collector support server 170) that includes the output of analysis processes and/or other processing performed by the one or more collector support servers (e.g., collector support server 160, collector support server 165, collector support server 170) on the device data and/or other state information collected by the native collector. Such collector results data received from the one or more collector support servers (e.g., collector support server 160, collector support server 165, collector support server 170) may, for example, include device risk information, device security state information, and/or other information determined by the one or more collector support servers (e.g., collector support server 160, collector support server 165, collector support server 170) based on the device data and/or other state information collected by the native collector. In addition, authentication hub computing platform 130 may aggregate and/or otherwise store the collector results data received from the one or more collector support servers (e.g., collector support server 160, collector support server 165, collector support server 170) in one or more databases, including one or more authentication databases used by authentication hub computing platform 130 in processing authentication requests received from various client devices (e.g., client computing device 150, client computing device 155).

Referring to FIG. 2F, at step 221, authentication hub computing platform 130 may process one or more authentication requests. For example, at step 221, authentication hub computing platform 130 may process one or more authentication requests from one or more client devices, such as client computing device 150, client computing device 155, and/or one or more other client devices, based on the collector results data received by authentication hub computing platform 130 from the one or more collector support servers (e.g., collector support server 160, collector support server 165, collector support server 170). In processing the one or more authentication requests from the one or more client devices based on the collector results data received by authentication hub computing platform 130 from the one or more collector support servers (e.g., collector support server 160, collector support server 165, collector support server 170), authentication hub computing platform 130 may, for instance, allow and/or deny access to one or more resources and/or interfaces (e.g., an online banking portal and/or mobile banking portal provided by client interface computing platform 120) based on the collector results data received by authentication hub computing platform 130 from the one or more collector support servers (e.g., collector support server 160, collector support server 165, collector support server 170).

At step 222, collector management computing platform 110 may receive collector results data from authentication hub computing platform 130. For example, at step 222, collector management computing platform 110 may receive, via the communication interface (e.g., communication interface 115), from the authentication hub computing platform (e.g., authentication hub computing platform 130), additional collector results information comprising third collector results information associated with the third collector. In some instances, collector management computing platform 110 may receive collector results data from authentication hub computing platform 130 automatically, for example, as authentication hub computing platform 130 receives collector results data from the one or more collector support servers (e.g., collector support server 160, collector support server 165, collector support server 170). In some instances, collector management computing platform 110 may receive collector results data from authentication hub computing platform 130 based on a predefined schedule and/or periodic monitoring. In some instances, collector management computing platform 110 may receive collector results data from authentication hub computing platform 130 based on a request to obtain and/or receive collector results data from authentication hub computing platform 130.

At step 223, collector management computing platform 110 may generate one or more console user interfaces. For example, at step 223, collector management computing platform 110 may generate an updated collector console user interface based on the additional collector results information received from the authentication hub computing platform (e.g., authentication hub computing platform 130). At step 224, collector management computing platform 110 may present the one or more console user interfaces. For example, at step 224, collector management computing platform 110 may cause the updated collector console user interface to be presented on an administrative computing device (e.g., administrative computing device 140).

Figure 6:
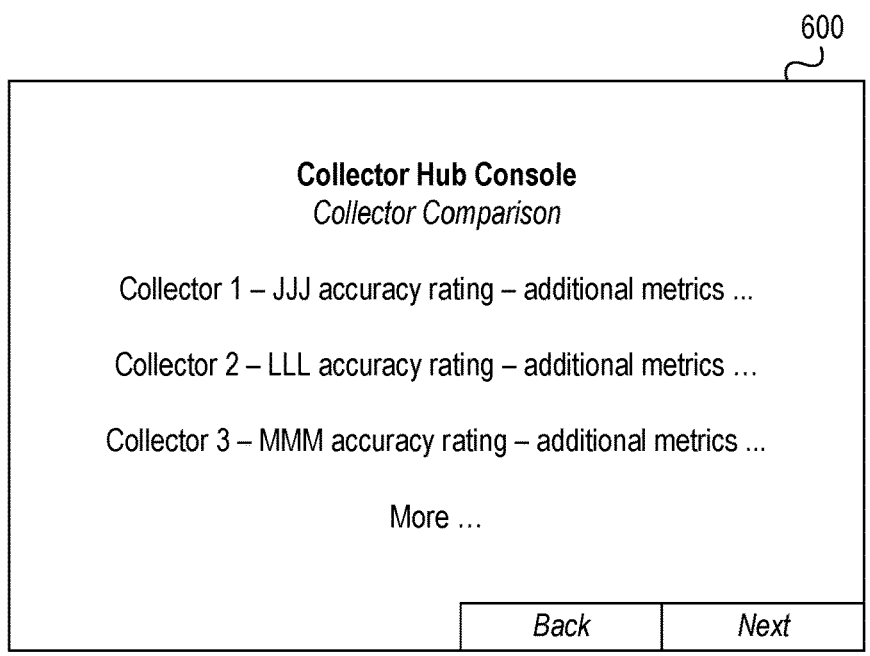

In some embodiments, generating the updated collector console user interface based on the additional collector results information received from the authentication hub computing platform may include generating a collector comparison user interface. For example, in generating the updated collector console user interface based on the additional collector results information received from the authentication hub computing platform (e.g., authentication hub computing platform 130), collector management computing platform 110 may generate a collector comparison user interface. In generating a collector comparison user interface and/or causing the collector comparison user interface to be presented (e.g., by administrative computing device 140), collector management computing platform 110 may, for instance, generate and/or cause administrative computing device 140 to display and/or otherwise present a graphical user interface similar to graphical user interface 600, which is illustrated in FIG. 6. As seen in FIG. 6, graphical user interface 600 may include text and/or other information identifying collectors that are currently in use, as well as accuracy ratings, performance metrics, and/or other information associated with the collectors (e.g., "Collector —JJJ accuracy rating—additional metrics . . . ; Collector 2—LLL accuracy rating—additional metrics . . . ; Collector 3—MMM accuracy rating—additional metrics . . . ") and/or one or more controls allowing a user interacting with graphical user interface 600 to view and/or modify settings and/or other information associated with collectors.

Figure 7:
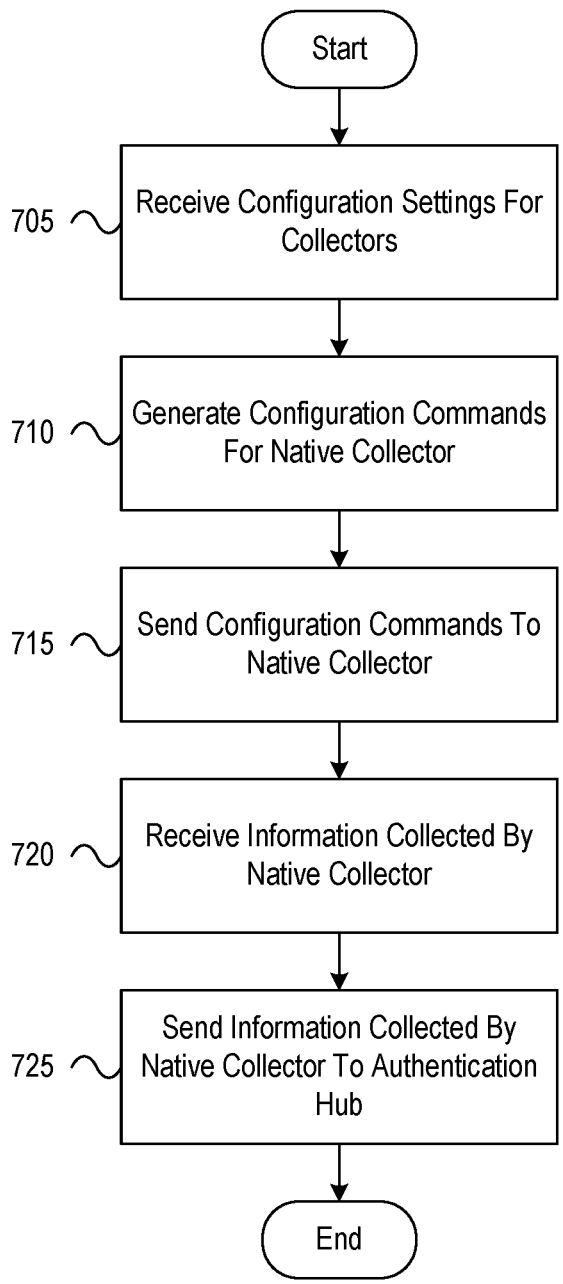
FIG. 7 depicts an illustrative method for controlling device data collectors using omni-collection techniques in accordance with one or more example embodiments.

FIG. 7 depicts an illustrative method for controlling device data collectors using omni-collection techniques in accordance with one or more example embodiments. Referring to FIG. 7, at step 705, a computing platform having at least one processor, a memory, and a communication interface may receive first configuration settings associated with a first collector and second configuration settings associated with a second collector. At step 710, the computing platform may generate one or more configuration commands for a native collector based on the first configuration settings associated with the first collector and the second configuration settings associated with the second collector. At step 715, the computing platform may send, via the communication interface, to a client interface computing platform associated with the native collector, the one or more configuration commands generated for the native collector. At step 720, the computing platform may receive, via the communication interface, from the client interface computing platform associated with the native collector, state information collected by the native collector based on the one or more configuration commands generated for the native collector. At step 725, the computing platform may send, via the communication interface, to an authentication hub computing platform, the state information received from the client interface computing platform associated with the native collector. In addition, sending the state information received from the client interface computing platform associated with the native collector to the authentication hub computing platform may cause the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive first configuration settings associated with a first collector and second configuration settings associated with a second collector;
      generate one or more configuration commands for a native collector based on the first configuration settings associated with the first collector and the second configuration settings associated with the second collector;
      send, via the communication interface, to a client interface computing platform associated with the native collector, the one or more configuration commands generated for the native collector, wherein the native collector is hosted on the client interface computing platform, and wherein the native collector collects device data from one or more client computing devices, based on the one or more configuration commands generated for the native collector, as one or more webpages are served to the one or more client computing devices by the client interface computing platform;
      receive, via the communication interface, from the client interface computing platform associated with the native collector, state information collected by the native collector based on the one or more configuration commands generated for the native collector; and
      send, via the communication interface, to an authentication hub computing platform, the state information received from the client interface computing platform associated with the native collector,
      wherein sending the state information received from the client interface computing platform associated with the native collector to the authentication hub computing platform causes the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector.

2. The computing platform of claim 1, wherein the first configuration settings associated with the first collector define a first set of data elements requested by the first collector, and the second configuration settings associated with the second collector define a second set of data elements requested by the second collector.

3. The computing platform of claim 2, wherein the first configuration settings associated with the first collector comprise first version information identifying a version of the first collector, and wherein the second configuration settings associated with the second collector comprise second version information identifying a version of the second collector.

4. The computing platform of claim 1, wherein generating the one or more configuration commands for the native collector based on the first configuration settings associated with the first collector and the second configuration settings associated with the second collector comprises:
generating at least one command for the native collector directing the native collector to collect one or more data elements requested by the first collector; and
generating at least one command for the native collector directing the native collector to collect one or more data elements requested by the second collector.

5. The computing platform of claim 1, wherein sending the state information received from the client interface computing platform associated with the native collector to the authentication hub computing platform comprises sending at least one command to the authentication hub computing platform directing the authentication hub computing platform to aggregate device data collected by the native collector for processing by one or more collector support servers.

6. The computing platform of claim 1, wherein sending the state information received from the client interface computing platform associated with the native collector to the authentication hub computing platform comprises sending at least one command to the authentication hub computing platform directing the authentication hub computing platform to send device data collected by the native collector to at least one collector support server for processing by the at least one collector support server.

7. The computing platform of claim 1, wherein the authentication hub computing platform is configured to receive collector results data from the first collector support server associated with the first collector and the second collector support server associated with the second collector, and the authentication hub computing platform is configured to process one or more authentication requests based on the collector results data received from the first collector support server associated with the first collector and the second collector support server associated with the second collector.

8. The computing platform of claim 1, wherein the memory stores additional computer-readable instructions that, when executed by the at least one processor, cause the computing platform to:
receive, via the communication interface, from the authentication hub computing platform, collector results information comprising first collector results information associated with the first collector and second collector results information associated with the second collector.

9. The computing platform of claim 8, wherein the memory stores additional computer-readable instructions that, when executed by the at least one processor, cause the computing platform to:
generate a collector console user interface based on the collector results information received from the authentication hub computing platform; and
cause the collector console user interface to be presented on an administrative computing device.

10. The computing platform of claim 9, wherein generating the collector console user interface based on the collector results information received from the authentication hub computing platform comprises generating a collector alert user interface.

11. The computing platform of claim 9, wherein generating the collector console user interface based on the collector results information received from the authentication hub computing platform comprises generating a collector version management user interface.

12. The computing platform of claim 1, wherein the memory stores additional computer-readable instructions that, when executed by the at least one processor, cause the computing platform to:
receive third configuration settings associated with a third collector;
generate one or more additional configuration commands for the native collector based on the third configuration settings associated with the third collector;
send, via the communication interface, to the client interface computing platform associated with the native collector, the one or more additional configuration commands generated for the native collector;
receive, via the communication interface, from the client interface computing platform associated with the native collector, additional state information collected by the native collector based on the one or more additional configuration commands generated for the native collector; and
send, via the communication interface, to the authentication hub computing platform, the additional state information received from the client interface computing platform associated with the native collector,
wherein sending the additional state information received from the client interface computing platform associated with the native collector to the authentication hub computing platform causes the authentication hub computing platform to share at least a portion of the additional state information received from the client interface computing platform associated with the native collector with a third collector support server associated with the third collector for processing by the third collector support server associated with the third collector.

13. The computing platform of claim 12, wherein the memory stores additional computer-readable instructions that, when executed by the at least one processor, cause the computing platform to:
receive, via the communication interface, from the authentication hub computing platform, additional collector results information comprising third collector results information associated with the third collector.

14. The computing platform of claim 13, wherein the memory stores additional computer-readable instructions that, when executed by the at least one processor, cause the computing platform to:

generate an updated collector console user interface based on the additional collector results information received from the authentication hub computing platform; and cause the updated collector console user interface to be presented on an administrative computing device.

15. The computing platform of claim 14, wherein generating the updated collector console user interface based on the additional collector results information received from the authentication hub computing platform comprises generating a collector comparison user interface.

16. A method, comprising:

at a computing platform comprising at least one processor, memory, and a communication interface:

receiving, by the at least one processor, first configuration settings associated with a first collector and second configuration settings associated with a second collector;

generating, by the at least one processor, one or more configuration commands for a native collector based on the first configuration settings associated with the first collector and the second configuration settings associated with the second collector;

sending, by the at least one processor, via the communication interface, to a client interface computing platform associated with the native collector, the one or more configuration commands generated for the native collector, wherein the native collector is hosted on the client interface computing platform, and wherein the native collector collects device data from one or more client computing devices, based on the one or more configuration commands generated for the native collector, as one or more webpages are served to the one or more client computing devices by the client interface computing platform;

receiving, by the at least one processor, via the communication interface, from the client interface computing platform associated with the native collector, state information collected by the native collector based on the one or more configuration commands generated for the native collector; and sending, by the at least one processor, via the communication interface, to an authentication hub computing platform, the state information received from the client interface computing platform associated with the native collector, wherein sending the state information received from the client interface computing platform associated with the native collector to the authentication hub computing platform causes the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector.

17. The method of claim 16, wherein the first configuration settings associated with the first collector define a first set of data elements requested by the first collector, and the second configuration settings associated with the second collector define a second set of data elements requested by the second collector.

18. The method of claim 17, wherein the first configuration settings associated with the first collector comprise first version information identifying a version of the first collector, and wherein the second configuration settings associated with the second collector comprise second version information identifying a version of the second collector.

19. The method of claim 16, wherein generating the one or more configuration commands for the native collector based on the first configuration settings associated with the first collector and the second configuration settings associated with the second collector comprises:

generating at least one command for the native collector directing the native collector to collect one or more data elements requested by the first collector; and generating at least one command for the native collector directing the native collector to collect one or more data elements requested by the second collector.

20. One or more non-transitory computer-readable media storing instructions that, when executed by a computing platform comprising at least one processor, memory, and a communication interface, cause the computing platform to:

receive first configuration settings associated with a first collector and second configuration settings associated with a second collector;

generate one or more configuration commands for a native collector based on the first configuration settings associated with the first collector and the second configuration settings associated with the second collector;

send, via the communication interface, to a client interface computing platform associated with the native collector, the one or more configuration commands generated for the native collector, wherein the native collector is hosted on the client interface computing platform, and wherein the native collector collects device data from one or more client computing devices, based on the one or more configuration commands generated for the native collector, as one or more webpages are served to the one or more client computing devices by the client interface computing platform;

receive, via the communication interface, from the client interface computing platform associated with the native collector, state information collected by the native collector based on the one or more configuration commands generated for the native collector; and send, via the communication interface, to an authentication hub computing platform, the state information received from the client interface computing platform associated with the native collector, wherein sending the state information received from the client interface computing platform associated with the native collector to the authentication hub computing platform causes the authentication hub computing platform to share at least a portion of the state information received from the client interface computing platform associated with the native collector with one or more of a first collector support server associated with the first collector for processing by the first collector support server associated with the first collector or a second collector support server associated with the second collector for processing by the second collector support server associated with the second collector.

* * * * *